United States Patent
Fujiwara

[11] Patent Number: 6,072,835
[45] Date of Patent: *Jun. 6, 2000

[54] VARIABLE TRANSFER RATE CONTROL CODING APPARATUS

[75] Inventor: Mitsuaki Fujiwara, Yokosuka, Japan

[73] Assignee: Victor Company of Japan, Ltd., Yokohama, Japan

[*] Notice: This patent is subject to a terminal disclaimer.

[21] Appl. No.: 09/030,380

[22] Filed: Feb. 25, 1998

Related U.S. Application Data

[62] Division of application No. 08/494,258, Jun. 23, 1995, Pat. No. 5,748,249.

[30] Foreign Application Priority Data

Jun. 24, 1994 [JP] Japan .................................. 6-165946

[51] Int. Cl.[7] .............................. H04B 1/66; H04N 7/12
[52] U.S. Cl. ..................... 375/240; 348/420; 348/419; 348/405; 382/239
[58] Field of Search .................... 348/420, 419, 348/405, 407, 409, 400, 415, 384, 469, 700; 382/239, 248, 251; 375/240; H04N 7/12; H04B 1/66

[56] References Cited

U.S. PATENT DOCUMENTS

| | | | |
|---|---|---|---|
| 4,734,767 | 3/1988 | Kaneko et al. | 348/400 |
| 5,038,209 | 8/1991 | Hang | 348/419 |
| 5,231,484 | 7/1993 | Gonzales et al. | 348/405 |
| 5,245,427 | 9/1993 | Kunihiro | 348/400 |
| 5,291,282 | 3/1994 | Nakagawa et al. | 348/384 |
| 5,301,242 | 4/1994 | Gonzales et al. | 382/56 |
| 5,515,105 | 5/1996 | Lim | 348/405 |
| 5,530,479 | 6/1996 | Fujihara | 348/405 |
| 5,532,745 | 7/1996 | Senda | 348/405 |
| 5,543,844 | 8/1996 | Mita et al. | 348/384 |

FOREIGN PATENT DOCUMENTS

| | | |
|---|---|---|
| 0493136 | 7/1992 | European Pat. Off. . |
| 0540961 | 5/1993 | European Pat. Off. . |
| 0595268 | 5/1994 | European Pat. Off. . |
| 0634867 | 1/1995 | European Pat. Off. . |
| 06141298 | 5/1994 | Japan . |

OTHER PUBLICATIONS

Signal Processing Image Communication, Cheng–Tie Chen, "Hybrid extended MPEG video . . .", Feb. 1, 1993, pp. 21–37.

*Primary Examiner*—Vu Le
*Assistant Examiner*—Gims S. Philippe
*Attorney, Agent, or Firm*—Jacobson, Price, Holman & Stern, PLLC

[57] ABSTRACT

A variable transfer rate coding apparatus codes moving picture signals of groups of pictures (GOPs). The picture signals are quantized under control of quantization step width and coded. A first code amount per GOP and a second code amount of picture data included GOP are obtained from the coded picture signals. In response to the first code amount, a total code amount of the picture signals of the GOPs are calculated and the total code amount is compared with a reference total code amount, to decide a first target code amount per GOP in order that the total code amount becomes a maximum amount within the reference total code amount. Further, in response to the first target code amount and the second code amount, a second target code amount of the picture data included in each GOP is determined in accordance with the maximum amount. The quantization step width is varied on the basis of the second target code amount.

5 Claims, 10 Drawing Sheets

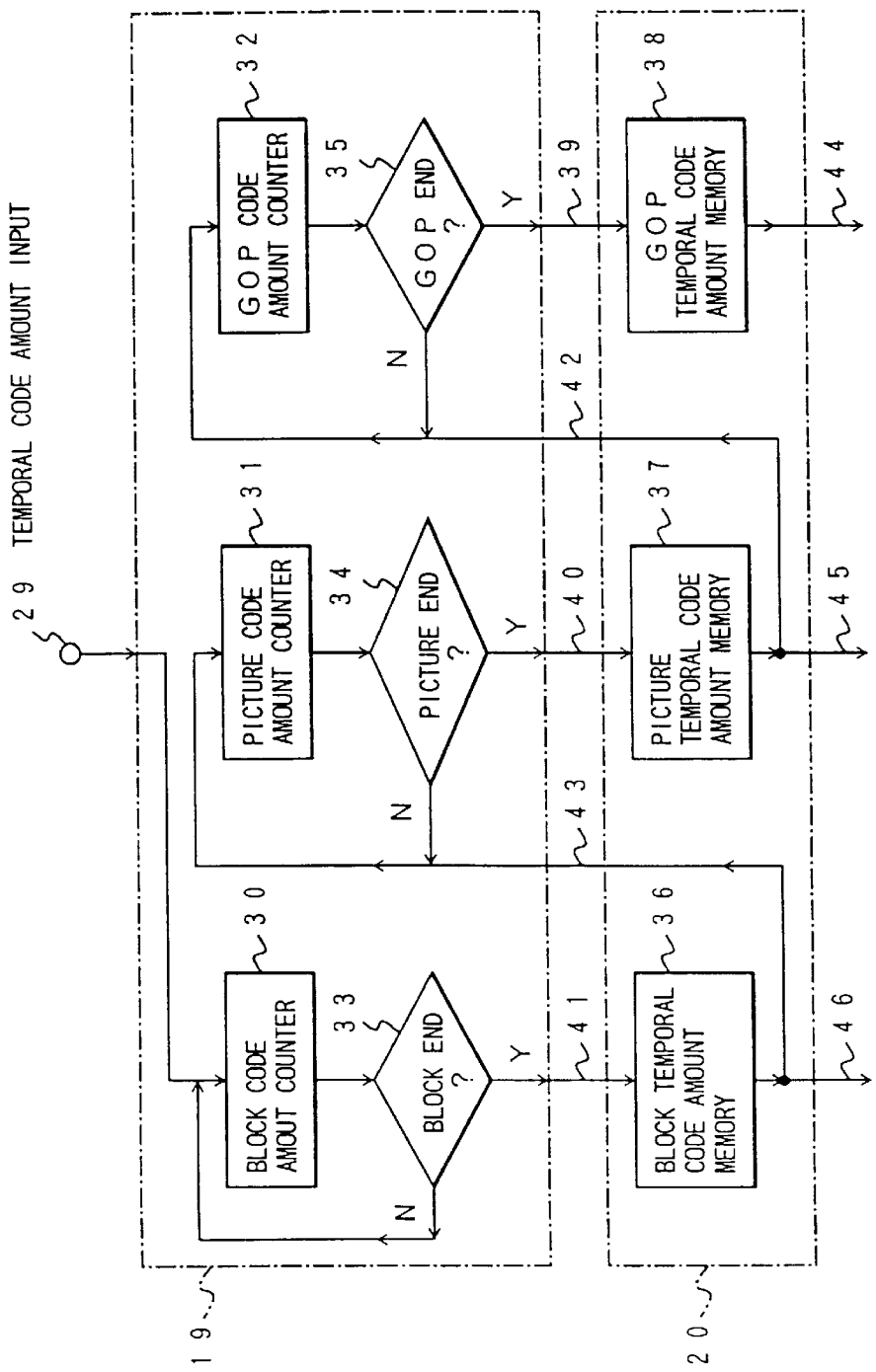
F I G. 6

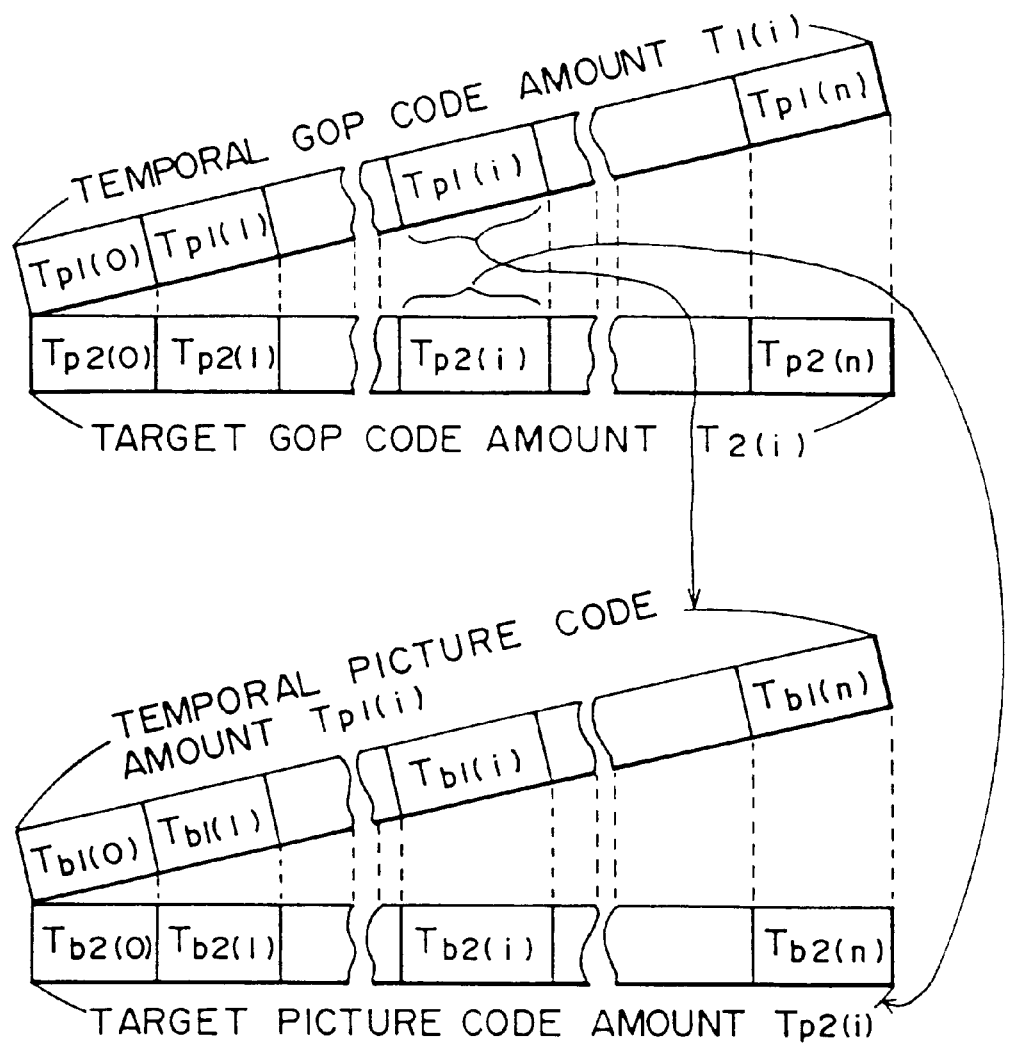
F I G. 10

VARIABLE TRANSFER RATE CONTROL CODING APPARATUS

This is a Divisional of application Ser. No. 08/494,258 filed Jun. 23, 1995.

BACKGROUND OF THE INVENTION

1. Field of the Invention

The present invention relates to a variable transfer rate control coding apparatus (variable bit coding apparatus) for efficiently coding signals by use of a smaller amount of codes in a digital recording apparatus, and more specifically to a coding apparatus for coding moving picture signals by controlling the transfer rate, that is, the code amount per unit time.

2. Description of the Prior Art

In the high efficiency coding of picture signals, the variable length coding technique is effective and reasonable, because a part of a picture having a small amount of picture data can be coded by use of a smaller amount of codes. In particular, in the case of the inter-picture prediction coding in unit of frame or field of moving picture, the amount of codes (often referred to as code amount simply, hereinafter) can be extremely reduced in the motion-less portion of the moving picture. Therefore, it is possible to increase the transmission and recording efficiency when the transfer rate (the code amount per unit time) are varied according to the contents of picture, on condition that the quality of the moving picture is roughly kept constant.

FIG. 1 is a block diagram showing a prior art variable transfer rate coding apparatus. In this prior art coding apparatus, the coding processing is executed twice for the same moving picture signals. That is, the first coding is executed in a temporal coding to determine a target transfer rate (a target code amount per unit time), and the second coding is executed in an actual coding.

Temporal Coding

In FIG. 1, A designates composing elements for executing the temporal coding, by which temporal code amounts of moving picture signals can be obtained. At this temporal coding, two selectors 11 and 18 are both switched to the a-side.

Picture signals outputted by a picture signal source 1 are inputted to a predict subtracter 2 and an activity detector 5.

Here, since the same picture signals are supplied twice to the coding section, all the picture signals before coding are recorded in a picture recording medium of a large capacity such as VTR. As the picture recording medium, any media such as memory elements, optical disk, HDD, etc. can be used, as far as the recording capacity is large enough.

In the predict subtracter 2, the inter-frame prediction signals (sometimes referred to as prediction signals, hereinafter) inputted from an inter-picture predictor 10 is subtracted from the picture signals. The subtracted results are inputted to a discrete cosine transformer (DCT) 3 as prediction residual signals.

The prediction residual signals are discrete-cosine transformed (referred to as DCTed, hereinafter) by the DCT 3. The DCTed signals are given to a quantizer 4. In the quantizer 4, the DCTed signals are quantized according to quatization control data (quantization step width/quantization scale) inputted by a quantize controller 6. These quantized signals are inputted to a variable length coder 7 and a local decoder 8.

In the local decoder 8, the quantized signals are inversely quantized and further inversely DCTed, that is, the codes are decoded as reproduced prediction residual signals. The decoded signals are inputted to an adder 9. In the adder 9, the inter-frame prediction signals inputted by the inter-picture predictor 10 and the reproduced prediction residual signals inputted by the local decoder 8 are added to obtain the reproduced picture signals. The obtained reproduced picture signals are supplied again to the inter-picture predictor 10.

Here, the inter-picture predictor 10 compensates for the reproduced picture signals by delaying the motion thereof by one frame, to generate inter-frame prediction signals. The generated inter-frame prediction signals are supplied to the predict subtracter 2 and the adder 9.

To the quantize controller 6, a reference quantization step width (a predetermined fixed value) is inputted through the selector 18 switched to the a-side, and further an activity for each picture signal block is inputted from the activity detector 5.

Here, the activity represents the degree of change for each block of the picture signals. Further, the picture signal block represents a block of picture signals partitioned in unit of a predetermined size pixel (e.g., 8×8 pixels).

In the quantize controller 6, the quantization step width is set according to the activity value, and the set quantization step width value is outputted to the quantizer 4 as quantization control data.

In the above-mentioned quantization control, the quantization step width is determined on the basis of the activity, in such a way as to become coarse when the activity is large but fine when small. The reason is as follows: in a block of a large activity, since the pictures change largely, even a relatively large coding error is not noticeable. On the other hand, in a block of a small activity, since the pictures change slightly, even a relatively small coding error is easily noticeable.

As described above, when the picture signal activity is adopted for the quantization control, it is possible to generate picture signals of a code amount for each block in such a way that the picture quality can be uniformalized form the visual standpoint.

Here, as the activity value, it is possible to use the dispersion of pixel values, the absolute addition of the prediction error values, the absolute addition of orthogonal transform coefficients, etc.

Total Code Amount Control

The variable length coder 7 codes the signals quantized by the quantizer 4 in way of variable length, and outputs the coded data whose data amount is compressed.

The data coded by the variable length coder 7 are inputted to a temporal code amount counter 12 via the selector 11 switched to the a-side. In the temporal code amount counter 12, the generated code amount is counted for each unit of time, and the counted code amount is inputted to a code amount converter 13 and a temporal code amount memory 14. In the temporal code amount memory 14, the temporal code amount used for each unit time in the actual coding (described later) is stored.

The code amount converter 13 is constructed as shown in FIG. 2. The code amount converter 13 decides the conversion characteristics for converting the temporal transfer rate (temporal code amount per unit time) into the target transfer rate. On the basis of the decided conversion characteristics, the total code amount of the whole moving picture signals can be controlled.

In more detail, in FIG. 2, the temporal code amount inputted through a temporal code amount input terminal 58 is converted by n-units of transfer rate converters (referred to as converters, hereinafter) 61, 62, . . . , 64 having n-units of different conversion characteristics. A plurality of transfer rates for each time unit converted in accordance with each of the conversion characteristics are added by each of accumulate adders 65, 66, . . . 68 over the entire duration of the moving picture, so that the total code amount of the whole moving picture can be obtained for each transfer rate converter.

Upon completion of the temporal coding, the total code amounts of the respective transfer rate converters 1 to n accumulated by the respective accumulate adders 65 to 68 are inputted to comparators 69, 70, . . . 72, respectively and further compared with the target total code amount determined on the basis of the recordable capacity of the recording medium. The compared results are inputted to a discriminator 73 for discriminating the comparison results of a plurality of the comparators 69, 70, . . . 72.

The discriminator 73 discriminates or selects the conversion characteristics which can convert the temporal code amount into the maximum total code amount less than the target total code amount (the recordable capacity of the medium), from among the respective total code amounts outputted from the respective accumulate adders 65, 66, 67, . . . 68. The selected conversion characteristics are inputted to a target transfer rate setter 15 of FIG. 1 through a conversion characteristics data output terminal 59.

FIG. 3 shows an example of the conversion characteristics of the converters 1 to n, respectively, in which the relationship between the temporal transfer rate (temporal code amount per unit time) and the target transfer rate is shown.

As shown in FIG. 3, an upper limit (Dmax) of the outputs of the transfer rate converters are first decided. This is because the recording medium and the decoder have an upper limit of the processing ability, so that the maximum transfer rate is determined on the basis of the upper limits of these elements. Therefore, although the variable transfer rates are adopted, a maximum target transfer rate is to be fixed to a value.

As shown in FIG. 3, the conversion characteristics of the transfer rate converters are determined to be logarithmic characteristics, for instance, so that the fluctuations of each of the target transfer rates can be suppressed as a whole. In other words, although each target transfer rate is generally controlled gently, since the picture quality deteriorates from the visual point of view in a part of picture where the temporal code amount per unit time is relatively small, the code amount is somewhat increased.

Actual Coding

In FIG. 1, B indicates a composing section for actual coding. In this section, the coding is executed by controlling the amount of generated codes so that the actual transfer rate approaches the target transfer rate for each unit time. In this operation, the selectors 11 and 18 are both switched to the b-side, respectively.

In FIG. 1, the picture signals the same as with the case of the temporal coding are outputted again from the picture signal source 1, and further coded in the same way as the temporal coding. Here, the predict subtracter 2, the orthogonal converter 3, the quantizer 4, the activity detector 5, the quantize controller 6, the variable code length coder 7, the local decoder 8, the adder 9 and the inter-picture predictor 10 all operate in the same way as with the case of the temporal coding, except the contents of the respective operation.

That is, in the actual coding, the output of the variable length coder 7 is inputted to a buffer 16 through the selector 11 switched to the b-side. Since the data inputted to the buffer 16 has been coded in variable length, although the amount of generated codes always varies, since the variation thereof can be absorbed by the buffer 16, the coded data of a fixed transfer rate can be outputted to a decoder (not shown) through a code output terminal 28.

The read rate at which the codes are read from the buffer 16 is controlled for each unit of time by data supplied by a target transfer rate setter 15. Therefore, the code amount outputted from the buffer 16 changes for each unit time. In the target transfer rate setter 15, the temporal code amount inputted from the temporal code amount memory 14 for each unit time is converted in accordance with the conversion characteristics inputted from the code amount converter 13, so that the target transfer rate can be determined.

On the other hand, the occupancy data of the buffer 16 is inputted to the quantize controller 6 via the selector 18 switched to the b-side.

In the quantize controller 6, the quantization step width is determined according to the inputted occupancy data of the buffer 16 and the activity (the degree of change in picture signals for each block) obtained by the activity detector 5. The determined quantization step width is inputted to the quantizer 4.

Further, FIG. 4 shows an example of the relationship between the buffer occupancy and the quantization step width, which is used for the quantization control.

In the above-mentioned prior art coding apparatus, the target transfer rate has been determined on the basis of the amount of codes generated in unit of several pictures in the actual coding operation, and further the quantization step width has been determined on the basis of the buffer occupancy.

In this case, since the relationship between the buffer occupancy and the quantization step width is determined as shown in FIG. 4, when the buffer 16 is full (i.e., many codes are stored), the quantization step width changes coarsely and when empty (i.e., small codes are stored), the quantization step width changes finely.

In the prior art coding apparatus, however, since the quantization step width is determined for each block according to the buffer occupancy, there exists a problem in that the quantization step width changes largely according to the change in the amount of generated codes, with the result that the picture quality is not stable and varies noticeably.

SUMMARY OF THE INVENTION

With these problems in mind, therefore, it is the object of the present invention is to provide a coding apparatus which can determine an appropriate amount of codes easily so that the picture quality can be improved by uniformalizing the picture quality.

To achieve the above-mentioned object, the present invention provides a variable transfer rate coding apparatus for coding moving picture signals of groups of pictures, comprising: a quantizer for quantizing the picture signals under control of quantization step width: a coder for coding the quantized picture signals; code amount obtaining means for obtaining a first code amount of the coded picture signals per group of pictures and a second code amount of picture data included per group of pictures; first determining means, in response to the first code amount, for calculating a total code amount of the picture signals of the groups of pictures and comparing the total code amount with a reference total code amount, to decide a first target code amount per group of pictures in order that the total code amount becomes a maximum amount within the reference total code amount; second determining means, in response to the first target code amount and the second code amount, for determining a second target code amount of the picture data included in each group of pictures in accordance with the maximum amount; and control means for varying the quantization step width on the basis of the second target code amount.

The code amount obtaining means may comprise: first counting means, in response to the coded picture signals per group of pictures, for sequentially counting code amounts of blocks per picture; second counting means, in response to the code amounts of blocks, for sequentially counting code amounts of pictures in each group; and third counting means, in response to the code amounts of pictures, for counting the first code amounts, wherein at least either of a code amount of a block or a picture is obtained as the second code amount.

The first determining means may comprise: converting means for sequentially converting the first code amount per group of pictures into different code amounts by means of different conversion characteristics; accumulating means for accumulating each different code amount per group of pictures over the groups of pictures to generate different total code amounts of the groups of pictures under the different conversion characteristics; comparing means for comparing each of the different total code amounts with the maximum total code amount; and third determining means for determining which one of the different total code amounts is the largest and the closest to the maximum total code amount, to output one of the conversion characteristics corresponding to the determined total code amount as the first target code amount, thus the second determining means converting the second code amount into the second target code amount by means of the outputted conversion characteristics.

The variable transfer rate coding apparatus may further comprises comparing means for comparing the first code amount with the second target code amount to output quantization step width information for each block of a picture, thus the control means varying the quantization step width on the basis of the quantization step width information. The comparing means may comprise: detecting means, in response to the coded picture signals, for detecting a code amount of each block; subtracting means for subtracting the detected code amount from the second target code amount; first comparing means for comparing a subtraction result of the subtracting means with a reference positive value and outputting a first comparison signal when the subtraction result is positive and grater than the reference positive value; second comparing means for comparing the subtraction result with a reference negative value and outputting a second comparison signal when the subtraction result is negative and grater than the reference negative value; and means, in response to the first comparison signal, for outputting a first quantization step width information, thus the control means narrowing the quantization step width, while in response to the second comparison signal, for outputting a second quantization step width information, thus the control means widening the quantization step width.

The above and other related objects and features of the invention will be apparent from a reading of the following description of the disclosure found in the accompanying drawings and the novelty thereof pointed out in the appended claims.

BRIEF DESCRIPTION OF THE DRAWINGS

FIG. 6 is a block diagram showing a temporal code amount counter 19 and a temporal code amount memory 20 of the coding apparatus according to the present invention shown in FIG. 5;

FIG. 10 is an illustration for assistance in explaining the operation of the target code amount converter of the coding apparatus shown in FIG. 5 according to the present invention;

DETAILED DESCRIPTION OF THE EMBODIMENTS

A preferred embodiment of the present invention will be described hereinbelow in detail with reference to the attached drawings.

Figure 1:
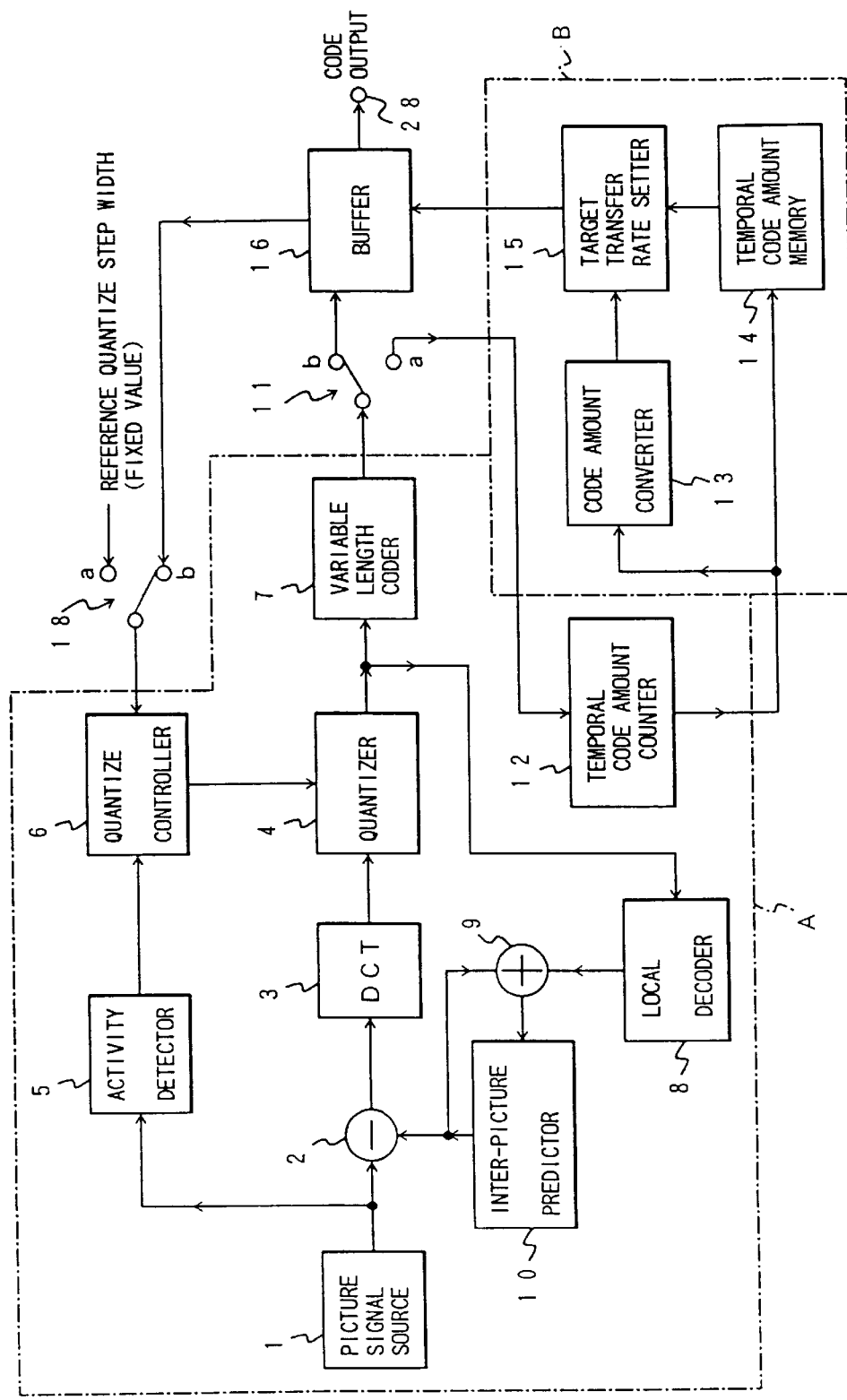
FIG. 1 is a block diagram showing a prior art variable transfer rate coding apparatus.
Figure 2:
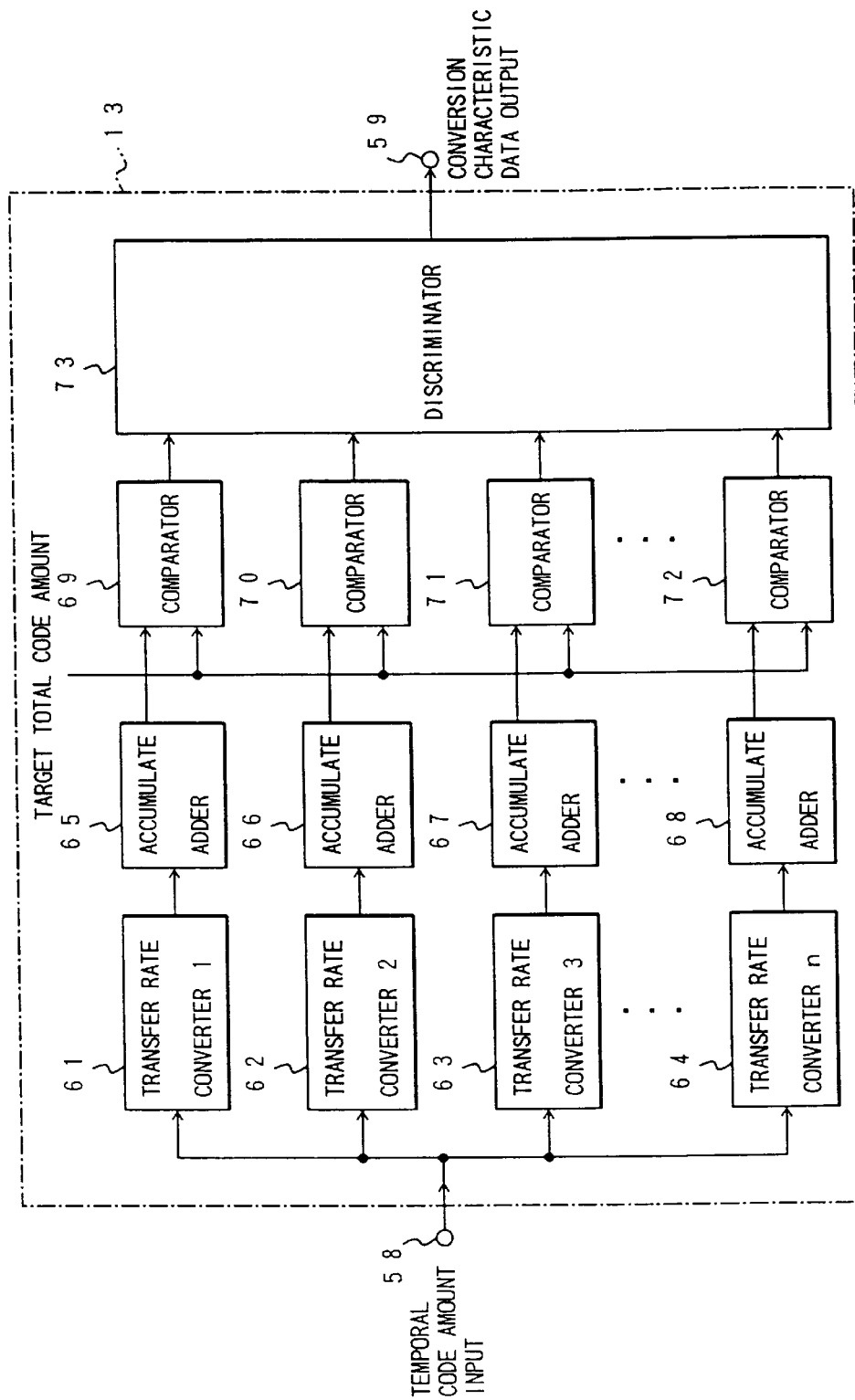
FIG. 2 is a block diagram showing a code amount converter 13 of the prior art coding apparatus shown in FIG. 1.
Figure 3:
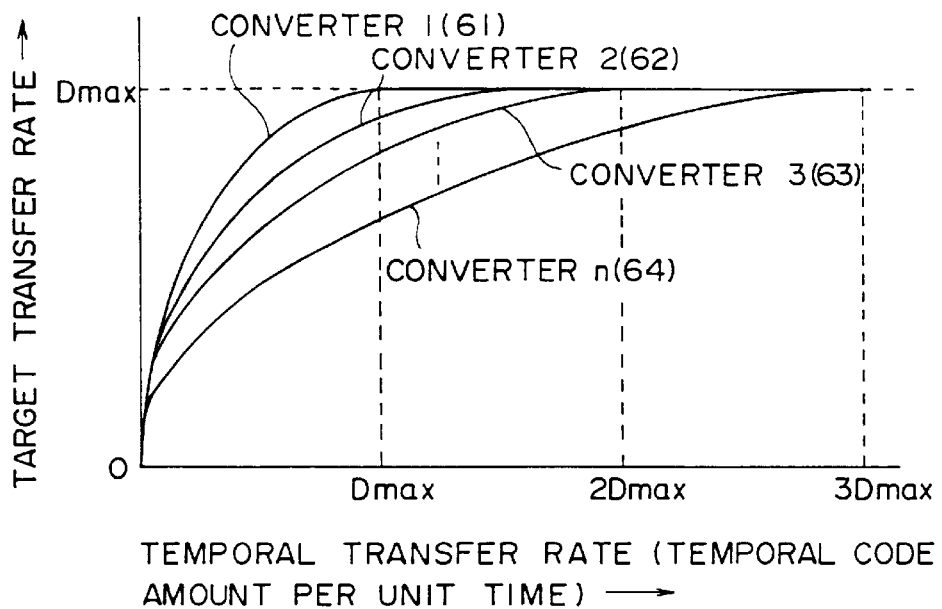
FIG. 3 is a graphical representation showing the conversion characteristics between the temporal transfer rate (the temporal code amount per unit time) and the target transfer rate.
Figure 4:
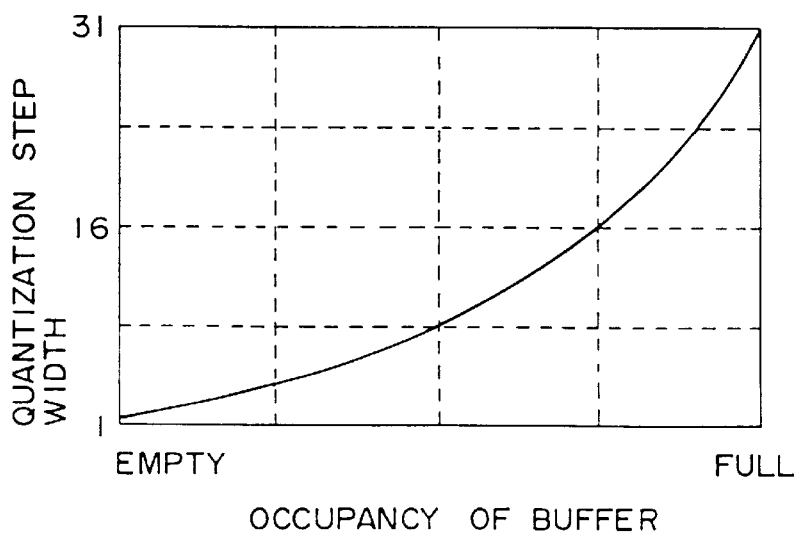
FIG. 4 is a graphical representation showing the way of controlling the quantization, that is, the relationship between the buffer occupancy and the quantization step width of the prior art coding apparatus.
Figure 5:
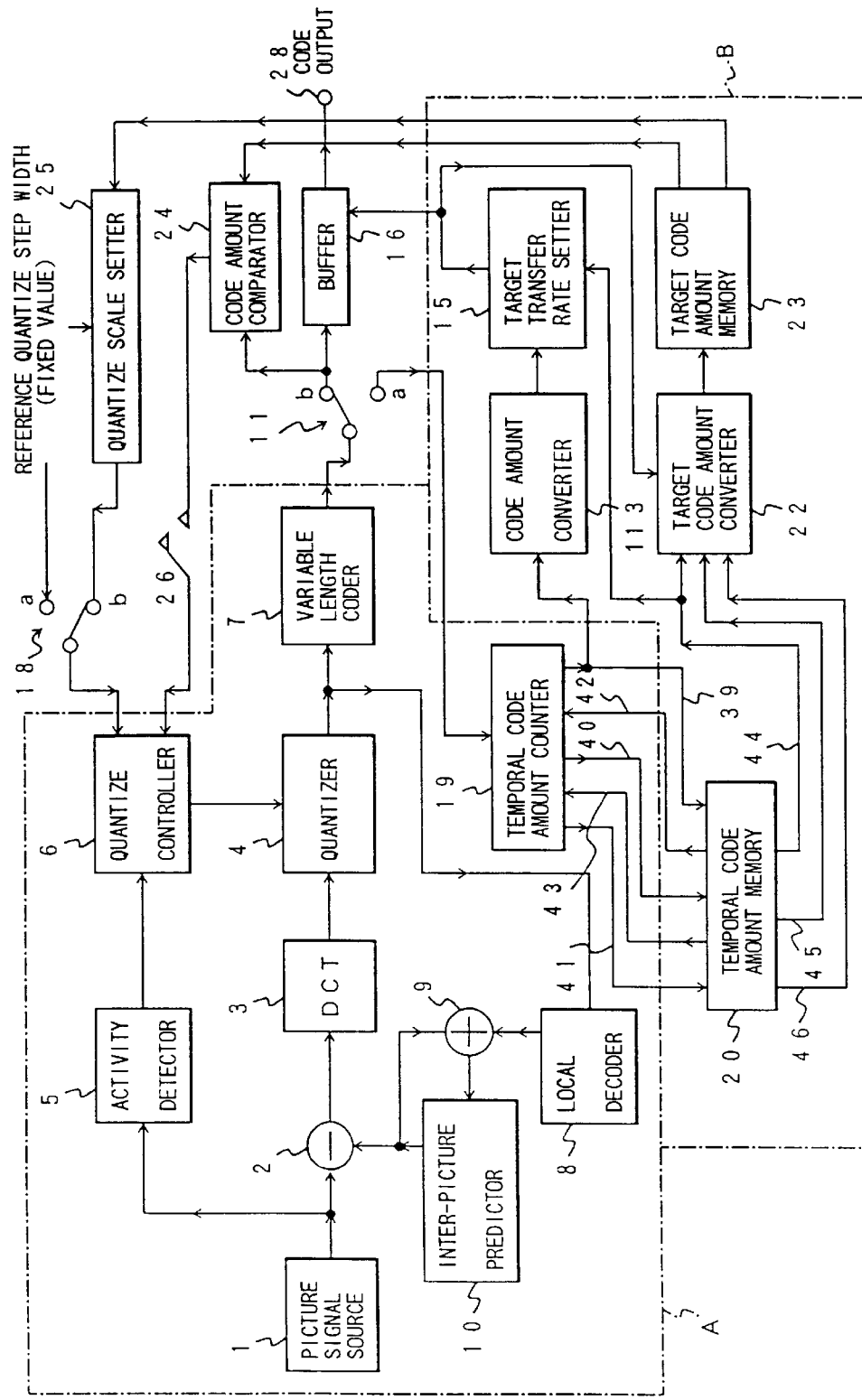
FIG. 5 is a block diagram showing an embodiment of the variable transfer rate coding apparatus according to the present invention.

FIG. 5 shows an embodiment of the variable transfer rate coding apparatus according to the present invention, in which the same reference numerals have been retained for the similar elements which have the same functions as with the case of the prior art coding apparatus shown in FIG. 1.

The major difference between the coding apparatus of the present invention shown in FIG. 5 and the prior art coding apparatus shown in FIG. 1 is that there are additionally provided a temporal code amount counter 19, a temporal code amount memory 20, a target code amount converter 22, a target code amount memory 23, a code amount comparator 24, a quantization step width setter 25, a switch 26 and a code amount converter 113.

In FIG. 5, the coding apparatus comprises a picture signal source 1, a predict subtracter 2, a DCT 3, a quantizer 4, an activity detector 5, a variable length coder 7, a local decoder 8, an adder 9, a predictor 10, two selectors 11 and 18, a target transfer rate setter 15, a buffer 16, a code output terminal 28 (in the same way as with the case of the prior art apparatus), and additional above-mentioned elements such as the temporal code amount counter 19 (shown in FIG. 6 as a practical example), the temporal code amount memory 20 (shown in FIG. 6 as a practical example), the target code amount converter 22, the target code amount memory 23, the code amount comparator 24, the quantization step width setter 25, the switch 26 and the code amount converter 113.

In the coding apparatus shown in FIG. 5, the coding processing is executed twice for the same moving picture signals.

Temporal Coding

In FIG. 5, A designates a composing section provided for the temporal coding, by which temporal code amount of moving picture signals can be obtained. At this temporal coding, two selectors 11 and 18 are both switched to the a-side and the switch 26 is turned off.

Picture signals outputted by the picture signal source 1 are inputted to the predict subtracter 2 and the active detector 5.

Here, since the same picture signals are supplied twice to the coding section, all the picture signals before coding are recorded in a picture recording medium of a large capacity such as VTR. As the picture recording medium, any media such as memory elements, optical disk, HDD, etc. can be used, as far as the recording capacity is large enough.

In the predict subtracter 2, inter-frame prediction signals inputted by an inter-picture predictor 10 are subtracted from the picture signals. The subtracted results are inputted to the DCT 3 as the prediction residual signals.

The prediction residual signals are DCTed by the DCT 3. The DCTed signals are given to the quantizer 4. The quantizer 4 quantizes the DCTed signals according to quatization control data (quantization step width) inputted by the quantize controller 6. These quantized signals are inputted to the variable length coder 7 and the local decoder 8.

In the local decoder 8, the quantized signals are inversely quantized and further inversely DCTed, that is, the codes are decoded as reproduced prediction residual signals. The decoded signals are inputted to the adder 9. In the adder 9, the inter-frame prediction signals inputted by the inter-picture predictor 10 and the reproduced prediction residual signals inputted by the local decoder 8 are added to each other as reproduced picture signals. The reproduced picture signals are supplied to the inter-picture predictor 10.

In the inter-picture predictor 10, the reproduced picture signals are delayed by one frame for motion compensation to generate inter-frame prediction signals. The generated inter-frame prediction signals are supplied to the predict subtracter 2 and the adder 9.

In the activity detector 5, the degree of change of the picture data is detected on the basis of the dispersion of pixel values, the absolute addition of the prediction error values, the absolute addition of orthogonal transform coefficients, etc. Further, the data (necessary when the quantization step width is to be decided by the quantize controller 6) are generated according to the detected degree of change of the picture data for each of the sequential blocks (e.g., 8×8 pixels) partitioned from the picture signals. The generated data are supplied to the quantize controller 6.

Figure 7:
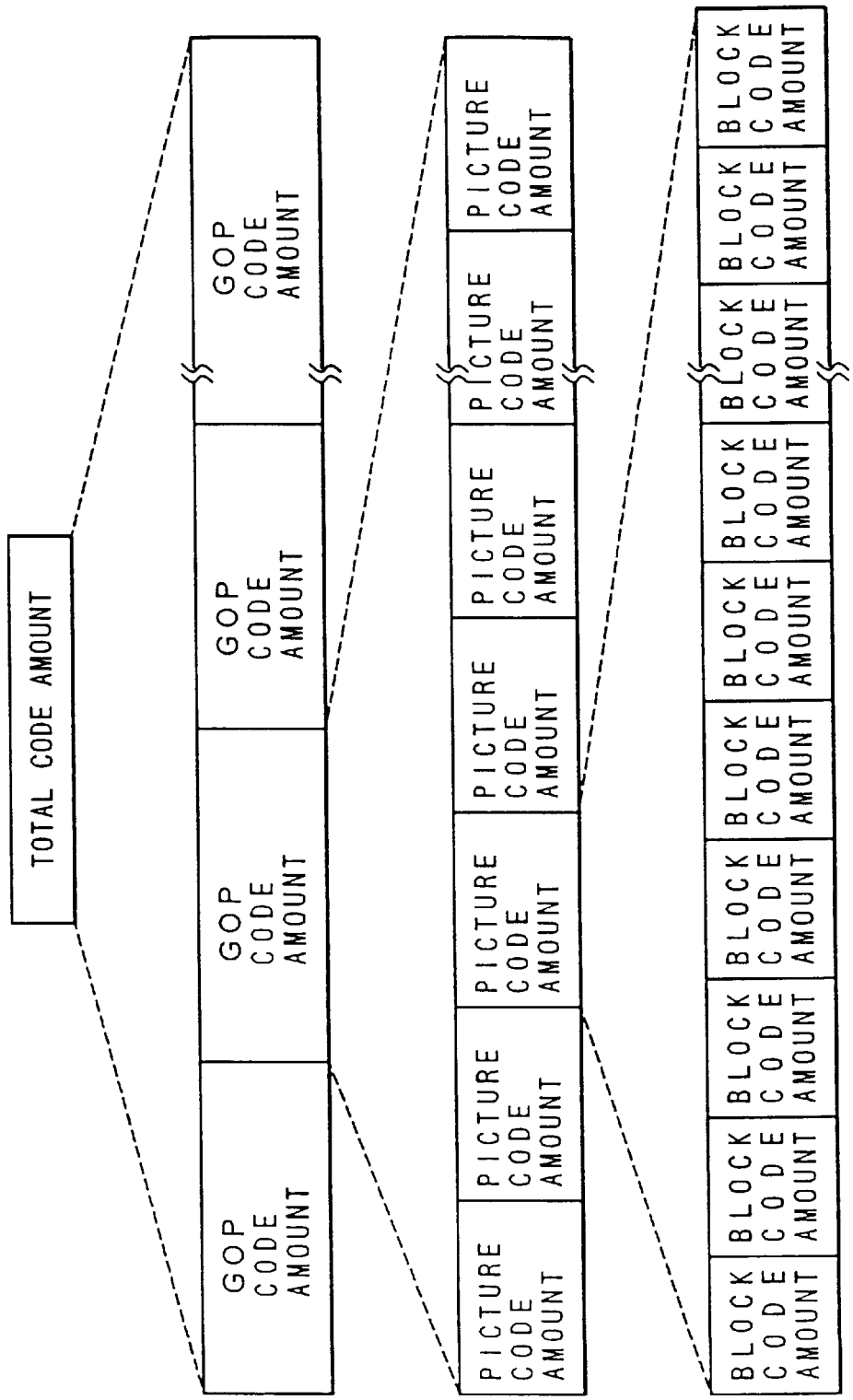
FIG. 7 is an illustration for assistance in explaining the coded picture signals related to the present invention.

Further, the sequential blocks partitioned from the picture signals are collected as a picture, and a plurality of pictures are collected as a picture unit GOP composed of a group of pictures, as depicted in FIG. 7.

To the quantize controller 6, a reference quantization step width (a predetermined fixed value) is inputted through the selector 18 switched to the a-side. Further, the data used to set the quantization step width is supplied from the activity detector 5 to the quantize controller 6.

On the basis of these data, in the case of a picture whose picture contents change violently, the quantization step width is set to a large value by the quantize controller 6. Further, in the case of a picture whose picture contents change slightly, the quantization step width is set to a small value by the quantize controller 6.

Total Code Amount Control

The variable length coder 7 codes the signals quantized by the quantizer 4 in way of variable length, and outputs the coded data whose data amount is compressed.

The data coded by the variable length coder 7 are inputted to the temporal code amount counter 19 via the selector 11 switched to the a-side.

FIG. 6 shows a practical construction of the temporal code amount counter 19. In FIG. 6, the temporal code amount counter 19 comprises a block code amount counter 30, a picture code amount counter 31, a GOP code amount counter 32, a block end detector 33 for detecting an end of each block, a picture end detector 34 for detecting an end of each picture, and a GOP end detector 35 for detecting an end of each GOP.

To a terminal 29 of the temporal code amount counter 19, coded data of the sequential blocks are supplied from the variable length coder 7 through the selector 11 switched to the a-side. The supplied coded data are inputted to the block code amount counter 30.

On the basis of the coded data supplied to the block code amount counter 30, the code amount for each of the sequential blocks is counted by the operation of both the block code amount counter 30 and the block end detector 33, to generate the code amount data for each of the sequential blocks.

The counted code amount data for the blocks are sequentially inputted to and stored in the block temporal code amount memory 36 of the temporal code amount memory 20 via a transmission line 41. Further, the code amount data for each block is read from the temporal block code amount memory 36, and then inputted to the picture code amount counter 31 of the temporal code amount counter 19 through a line 43.

On the basis of the coded data supplied to the picture code amount counter 31, the code amount for each of sequential pictures is counted by the operation of both the picture code amount counter 31 and the picture end detector 34, to generate the sequential code amount data for the pictures.

The counted code amount data for the pictures are sequentially inputted to and stored in the picture temporal code amount memory 37 of the temporal code amount memory 20 via a transmission line 40. Further, the code amount data for each picture is read from the picture temporal code amount memory 37, and then inputted to the GOP code amount counter 32 of the temporal code amount counter 19 through a line 42.

On the basis of the coded data supplied to the GOP code amount counter 32, the code amount for each of sequential GOPs is counted by the operation of both the GOP code amount counter 32 and the GOP end detector 35, to generate the sequential code amount data for the GOPs.

The counted code amount data for the GOPs are sequentially inputted to and stored in the GOP temporal code amount memory 38 of the temporal code amount memory 20 via a transmission line 39.

The code amount data stored in the temporal code amount memory 20 (i.e., block temporal code amount memory 36, the picture temporal code amount memory 37 and the GOP temporal code amount memory 38) as described above are read therefrom at the second coding of the picture signals supplied from the picture signal source 1.

Further, in FIG. 6, the temporal code amount counter 19 and the temporal code amount memory 20 are constructed in such a way that the code amounts of three stages (block, picture and GOP) are counted separately by the temporal code amount counter 19 and further stored separately in the temporal code amount memory 20. Without being limited thereto, it is also possible to separate the code amounts to five-stage hierarchies such as block, macro-block, slice, picture and GOP and to count and store the respective code amounts of the five stages, separately, as with the case of the ISO 11172-2 (International Standard of Motion Picture). In more general expression, it is possible to separate, count and store the code amount into N-stage hierarchies (N: a positive integer), individually.

Figure 12:
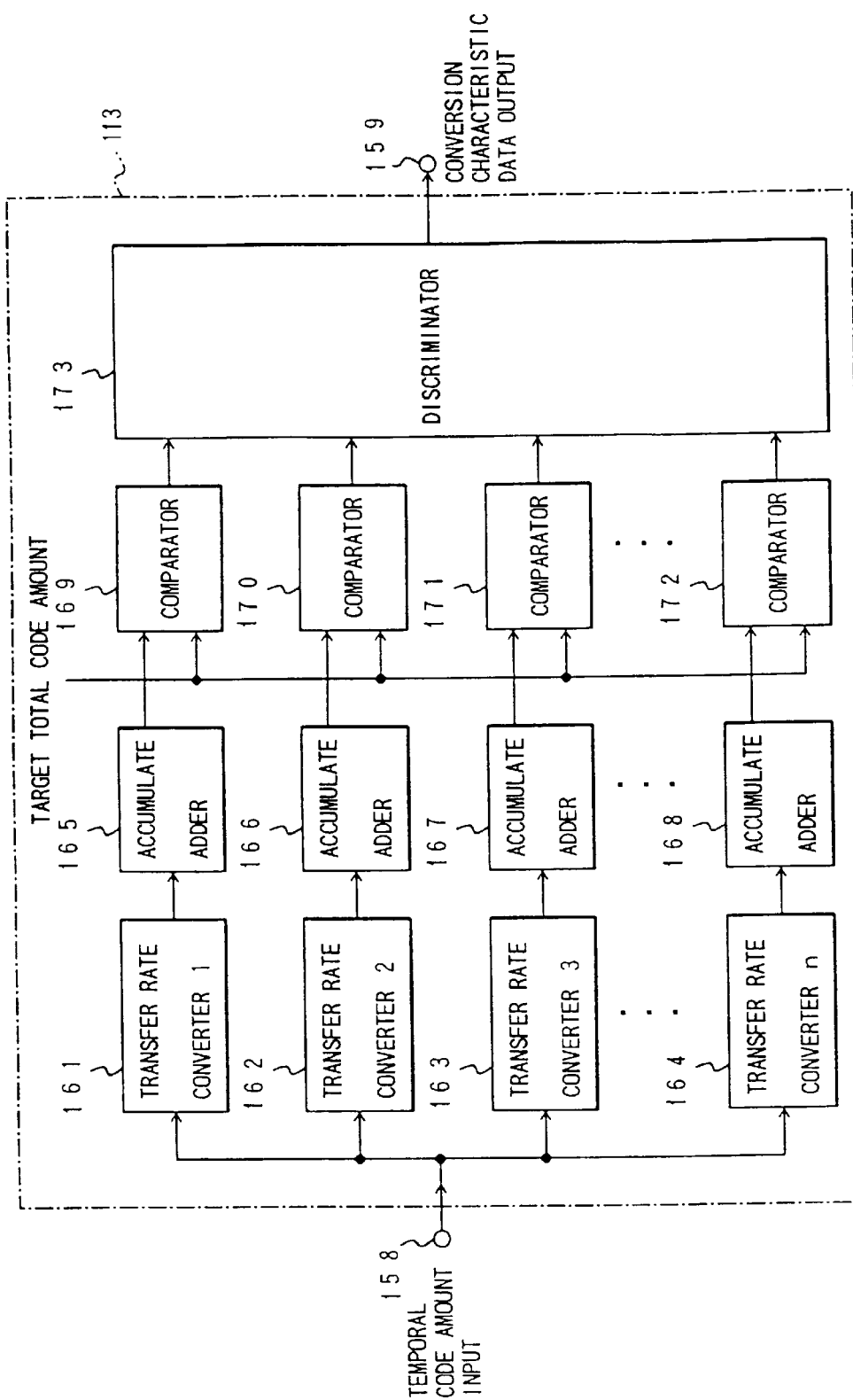
FIG. 12 is a block diagram showing a code amount converter 113 of the coding apparatus according to the present invention shown in FIG. 5.

Further, at the first coding of the picture signals supplied from the picture signal source 1, the sequential temporal code amount data of the GOPs outputted from the temporal code amount counter 19 through the line 39 are supplied to the code amount converter 113 and converted into target code amount data in accordance with the conversion characteristics stored therein. FIG. 12 shows an example of the code amount converter 113.

Here, when the temporal code amounts of the sequential GOPs (groups of pictures each composed of a plurality of pictures) supplied from the temporal code amount counter 19 to the code amount converter 113 at the first coding are denoted by T1$i$ (i designates a numeral from 1 to n indicative of the order of the sequential GOPs), and when the target code amounts obtained by converting the temporal code amounts T1$i$ on the basis of the conversion characteristics fg of the code amount converter 113 are denoted by T2$i$, the relationship between T2$i$, fg and T1$i$ can be expressed by the following formula:

$$T2i = fg(T1i) \tag{1}$$

Figure 8:
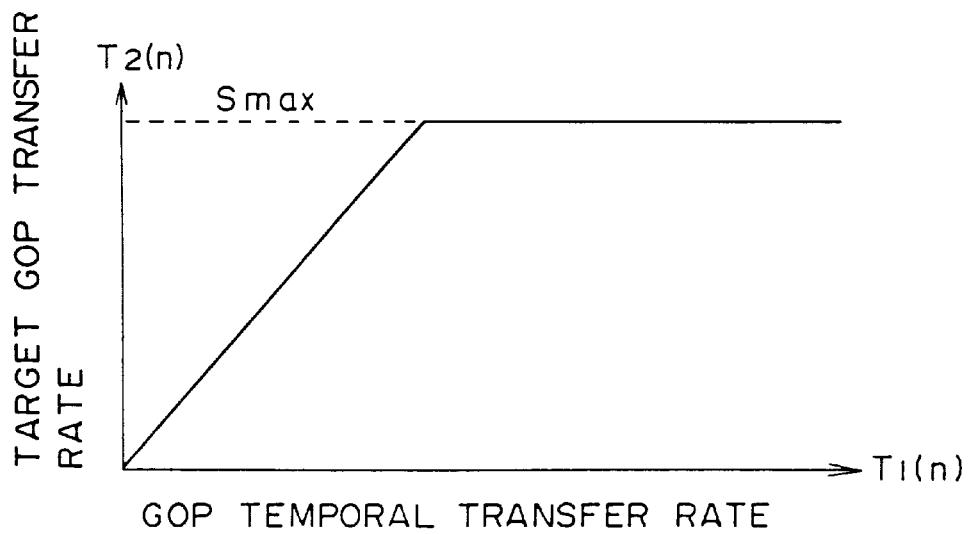
FIG. 8 is a graphical representation showing an example of the conversion characteristics between the GOP temporal transfer rate and the target transfer rate related to the present invention.

Further, as the conversion characteristics fg, it is possible to use the characteristics obtained on the basis of the ratio of the total temporal code amount S1 to the target code amount S2 at the second coding operation as expressed by the following formula (e.g., as shown in FIG. 8):

$$fg(x) = k \cdot S1/S2 \cdot x \tag{2}$$

where k is a constant (k>0).

Figure 9:
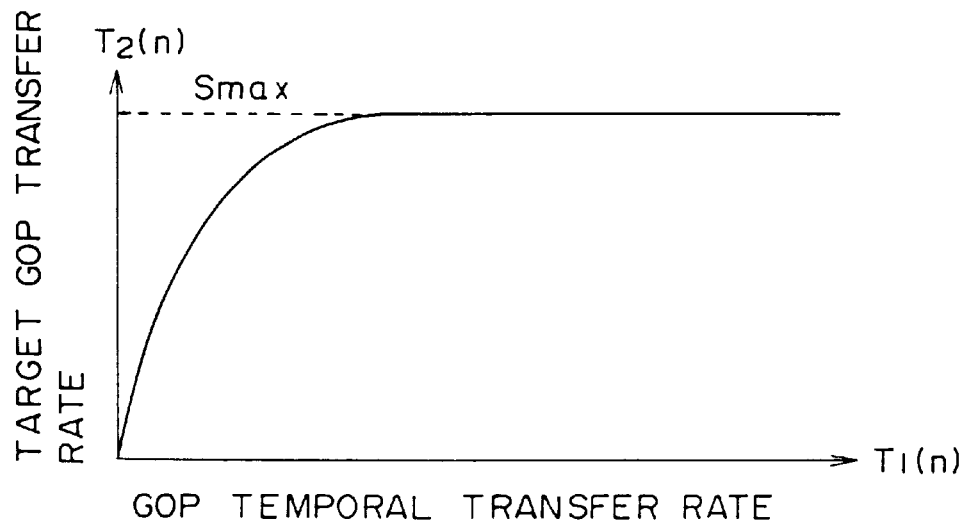
FIG. 9 is another graphical representation showing another example of the conversion characteristics between the GOP temporal transfer rate and the target transfer rate related to the present invention.

Further, since the picture quality deteriorates with decreasing amount of generated codes of the GOP, it is also preferable to use the conversion characteristics such that a large code amount can be determined when the amount of the generated codes is small, as expressed by the following formula (e.g., as shown in FIG. 9):

$$fg(x) = a \cdot X\hat{\ }b \tag{3}$$

where ^ denotes the power, and a and b denote a constant, respectively (a>0, 0<b<1).

Further, the upper limit of the target code amounts T2$i$ is determined by the capacity of the recording medium for recording coded data or the restriction of the decoding apparatus.

A plurality of the converters 161 to 164 of the code amount converter 113 shown in FIG. 12 are provided with mutually different conversion characteristics fg1, fg2, fg3, . . . (FIGS. 8 and 9 show an example of the conversion characteristics) so that different target code amounts can be outputted on the basis of the temporal code amounts inputted thereto. Further, as the target total code amount to be set, the total capacity of the recording medium used to record the coded data obtained by coding the picture signals can be used, for instance.

Therefore, the same coded data of the same picture signals are supplied from the input terminal 158 to the n-units of the circuit arrangements of the converter 161, the accumulate adder 165 and the comparator 169; the converter 162, the accumulate adder 166 and the comparator 170; the converter 163, the accumulate adder 167 and the comparator 171; . . . ; and the converter 164, the accumulate adder 168 and the comparator 172 of the code amount converter 113.

That is, the temporal code amount data of the sequential GOPs as described above are converted by the n-units of the converters 161 to 164 having different conversion characteristics to obtain the different converted code amount data which is determined on the basis of the recordable capacity of the recording medium. The different converted code amount data for each GOP are added by the n-units of the different accumulate adders 165 to 168, respectively to obtain the n-units of the different accumulated code amount data for the whole picture signals. The n-units of the different accumulated coded data are compared with the determined target total code amount. Therefore, the n-units of the outputs of the n-unit comparators 169 to 172 have different comparison results with respect to the same determined target total code amount, respectively.

The discriminator 173 discriminates or selects the conversion characteristics for converting the temporal code amount for the whole picture signals into the maximum code amount, from among the n-unit outputs of the comparators 169 to 172 provided separately in the code amount converter 113, within a range of the same set target total code amount. The transfer rate data corresponding to the discriminated conversion characteristics discriminated as above are given to the target transfer rate setter 15 of FIG. 5 through an output terminal 159.

Actual Coding

In FIG. 5, the section enclosed by B serves the actual coding, by which the picture signals the same as used for the first coding (temporal coding) already explained are outputted from the picture signal source 1 for the second coding. In this case, the two selectors 11 and 18 are both switched to the b-side, respectively and the switch 26 is turned on.

At the second coding, the picture signals outputted by the picture signal source 1 are inputted to the predict subtracter 2 and the activity detector 5, in the same way as with the case of the first coding already explained.

In the predict subtracter 2, the inter-frame prediction signal inputted by the inter-picture predictor 10 is subtracted from the picture signals, and the subtracted results are inputted to the orthogonal converter 3 as the prediction residual signals.

Further, in the same way as with the case of the first coding, the prediction residual signals are DCTed (discrete cosine transformed) by the orthogonal converter 3, and then introduced to the quantizer 4. In the quantizer 4, the DCTed prediction signals are quantized in accordance with the quantization control data (quantization step width) inputted by the quantize controller 6. These quantized signals are inputted to the variable length coder 7 and the local decoder 8, respectively.

Further, in the same way as with the case of the first coding, the quantized signals are inversely quantized and further inversely DCTed by the local decoder 8, the decoded signals are inputted to the adder 9 as the reproduced prediction residual signals. In the adder 9, the inter-frame prediction signals inputted from the inter-picture predictor 10 and the reproduced prediction residual signals inputted from the local decoder 8 are added, and then supplied to the inter-picture predictor 10 as the reproduced picture signals.

Further, in the same way as with the case of the first coding, in the inter-picture predictor 10, the reproduced picture signals are delayed by one frame for motion compensation to generate the inter-frame prediction signals. The generated inter-frame prediction signals are supplied to the prediction subtracter 2 and the adder 9.

In the activity detector 5, in the same way as at the first coding, data for setting the quantization step width to be decided by the quantize controller 6 are generated in correspondence to the change rate of the picture data for each sequential block (e.g., 8×8 pixels) partitioned by the picture signals. The generated data are supplied to the quantize controller 6.

Figure 11:
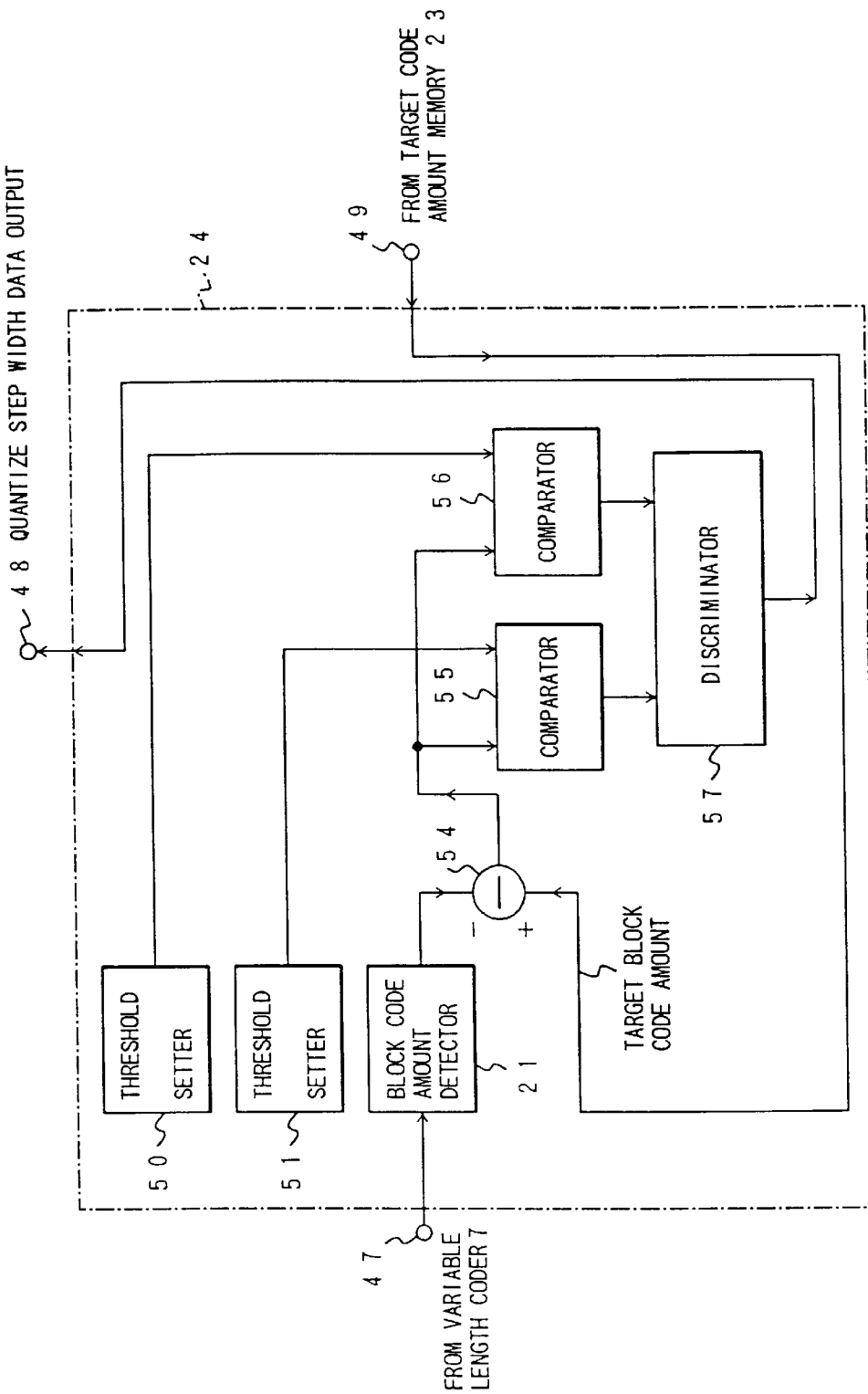
FIG. 11 is a block diagram showing a code amount comparator 24 of the coding apparatus shown in FIG. 5 according to the present invention.

To the quantize controller 6, data used for setting the quantization step width to be supplied in correspondence to the first block of each picture are supplied from the quantize scale setter 25 through the selector 18 switched to the b-side in the second coding. Further, in the period during which the data for setting the quantization step width is not supplied from the quantize scale setter 25 to the quantize controller 6, data for setting the quantization step width are supplied from the code amount comparator 24 (as shown in FIG. 11 in practice) to the quantize controller 6 via the switch 26.

The coded data outputted from the coder 7 at the second coding are inputted to and written in the buffer 16 in sequence and also inputted to the code amount comparator 24 via the selector 11 switched to the b-side. Further, the coded data written in the buffer 16 are read at a read speed determined on the basis of the transfer rate data inputted from the target transfer rate setter 15, as the coded data of variable transfer rate. The obtained coded data are outputted to another decoding apparatus (not shown) from the coded data output terminal 28.

Further, in the code amount comparator 24, target code amount data inputted from the target code amount memory 23 (described later) and the code amount of the coded data at the second coding are compared to output data (quantization step width control data) used for setting the quantization step width. The outputted data is supplied to the quantize controller 6 via the switch 26.

The quantization step width control data are inputted to the quantize controller 6 from the activity detector 5, the quantize scale setter 25, and the code amount comparator 24, respectively, in order that the maximum total code amount of the coded data for the whole picture signals can be determined within the range less than the target total code amount (e.g., the total memory capacity of the recording medium used to record the coded data of the whole picture) at the second coding.

Further, in the quantize step width setter 25, the quatization step width control data are generated for only the first block of each picture. In the code amount comparator 24, the quantization step width control data are generated for each block used when the quantize step width setter 25 does not generate the quantization step width control data.

In the code amount comparator 24, the target code amount data supplied from the target code amount memory 23 are compared with the code amount for each block (obtained by detecting the code amount of the coded data outputted by the variable length coder 7 at the second coding), and generates the quantization step width control data for each block used when the quantize step width setter 25 does not generate the quantization step width control data.

FIG. 11 is a block diagram showing an actual example of the code amount comparator 24.

In FIG. 11, the coded data outputted from the variable length coder 7 are inputted to a terminal 47. Further, the target code amount data for each of the sequential blocks is inputted from the target code amount memory 23 to a terminal 49. The data inputted to the terminal 49 is inputted to a subtracter 54 as a minuend.

A block code amount detector 21 detects the code amount for each of the sequential blocks on the basis of the coded data inputted to the terminal 47. The detected code amount data for each block is inputted to a subtracter 54 as a subtrahend.

The subtracter 54 subtracts the code amount data (subtrahend) for each block from the target block code amount data (minuend) for each block. The subtracted results are inputted to two comparators 55 and 56. A positive threshold value set to a threshold value setter 51 is inputted to the comparator 55, and a negative threshold value set to a threshold value setter 50 is inputted to the comparator 56.

When the output of the subtracter 54 is positive (i.e., the target block code amount is larger than the generated block code amount and further larger than the positive threshold value set in the threshold value setter 51), a comparison result of the comparator 55 is inputted to a discriminator 57. On the other hand, when the output of the subtracter 54 is negative (i.e., the target block code amount is smaller than the generated block code amount and further smaller than the negative threshold value set in the threshold value setter 50), a comparison result of the comparator 56 is inputted to the discriminator 57.

Further, when the output of the subtracter 54 lies between the positive threshold value set to the threshold value setter 51 and the negative threshold value set to the threshold value setter 50, that is, when a difference between the target block code amount and the generated block code amount is less than a predetermined value, the outputs of both the comparators 55 and 56 are set to zero. The discriminator 57 outputs the quantization step width control data for each block to the quantize controller 6 via the output terminal 48 and the switch 26.

When the two outputs of the two comparators 55 and 56 are both zero, the quantization step width control data inputted from the discriminator 57 to the quantize controller 6 as described above dose not change the quantization step width. Further, when the target block code amount is larger than the generated block code amount and thereby the comparison result of the comparator 55 is inputted to the discriminator 57, the control data decreases the quantization step width. Further, when the target block code amount is smaller than the generated block code amount and thereby the comparison result of the comparator 56 is inputted to the discriminator 57, the control data increases the quantization step width.

On the basis of the reference quantization step width (a predetermined fixed value) and the picture code amount data supplied by the target code amount memory 23, the quantize step width setter 25 generates the quantization step width control data for the first block of each picture, and inputs the generated control data to the quantize controller 6 via the selector 18. The quantize comparator 24 generates the quantization step width control data for each block when the quantize step width setter 25 does not generates the quantization step width data, and the generated control data are inputted to the quantize controller 6 via the switch 26. The switch 26 is turned on only when the quantization step width control data are transmitted.

The quantize step width setter 25 and the code amount comparator 24 generate the quantization step width control data by use of the target code amount data supplied by the target code amount memory 23. The target code amount data stored in the target code amount memory 23 can be obtained by converting the code amount data for each block and the code amount data for each picture of the picture signals stored in the temporal code amount memory 20 into the target code amounts by the converter 22.

Now, the code amount data obtained by the temporal code amount counter 19 at the first coding (i.e., the code amount data for each block, the code amount data for each picture, and the code amount data for each picture unit (GOP) composed of a plurality of pictures of picture signals) have been stored in the temporal code amount memory 20. The data for each GOP of these code amount data are given also to the code amount converter 113. The given data are used to decide the code amount conversion characteristics for converting a plurality of the temporal code amount data for each GOP in such a way that the maximum total code amount of the coded data of the whole picture signals can be obtained within the range less than the target total code amount (e.g., the total memory capacity of the recording medium used to record the coded data of the whole picture signals), as already explained with reference to FIG. 12.

As described above, when the data of the temporal code amount T1$i$ ($i$ denotes numerals 1 to n indicative of the order of the sequential GOPs) obtained at the first coding are supplied to the code amount converter 113, the code amount converter 113 decides the code amount conversion characteristics fg so that the total code amount of the coded data of the whole picture signals becomes the maximum total code amount data T2 (target code amount) within the target total code amount (e.g., the total memory capacity of the recording medium used to record the coded data of the whole picture signals). The code amount converter 113 supplies the target code amount T2$i$ ($i$ denotes numerals 1 to n indicative of the order of the sequential GOPs) to the target transfer rate setter 15. The supplied data T2$i$ are stored in the target transfer rate setter 15.

As described above, in the second coding stage, the code amount data is stored in the target transfer rate setter 15 in such the state that the temporal code amount T1$i$ for each GOP is converted into the target code amount T2$i$. In addition, the temporal code amount data for each sequential block, the temporal code amount data for each sequential picture, and the temporal code amount data for each GOP have been stored in the temporal code amount memory 20. Further, the target code amount T2$i$ for each GOP stored in the target transfer rate setter 15 has been obtained by converting the temporal code amount T1$i$ generated at the first coding by the code amount converter 113 in accordance with appropriate conversion characteristics fg.

The above-mentioned appropriate conversion characteristics fg can be obtained from the formula (1) as $$fg(x) = T2(i)/T1(i) \cdot x$$

where $i$ denotes numerals 1 to n indicative of the order of the sequential GOPs.

That is, at the second coding of the coding apparatus according to the present invention, data of the target code amount T2$i$ of each GOP stored in the target transfer rate setter 15, the temporal code amount for each block stored in the temporal code amount memory 20, the temporal code amount for each picture stored in the memory 20, and the temporal code amount for each GOP stored in the memory 20 are all supplied to the target code amount converter 22. The target code amount converter 22 converts the code amount data for each block and for each picture stored in the temporal code amount memory 20 into the target code amount data for each block and for each picture. These data are once stored in the target code amount memory 23, thereafter, the necessary data of these stored data are supplied to the quantize scale setter 25 and the code amount comparator 24.

FIG. 10 is an illustration for assistance in explaining the operation of the converter 22 for converting the temporal code amount for each block and the temporal code amount for each picture into the predetermined target code amounts having the relationship T2/T1, where the temporal GOP code amount is denoted by T1($i$) and the target GOP code amount is denoted by T2($i$).

In FIG. 10, Tp1(0), Tp1(1), ... denote the temporal code amounts of the sequential pictures, and Tp2(0), Tp2(1), ... denote the target code amounts of the sequential pictures. In this example, FIG. 10 indicates that the temporal code amount T1($i$) of one GOP can be converted into the target code amount T2($i$) of one GOP, where the temporal code amounts of a plurality of pictures for constituting one GOP having the temporal code amount T1($i$) are denoted by Tp1(O), Tp1(1), ...

In other words, when the code amounts are converted in accordance with the conversion characteristics expressed by fg=T2($i$)/T1($i$), the temporal code amounts Tp1(0), Tp1(1), ... of the sequential pictures for constituting the single GOP are also converted in accordance with the conversion characteristics expressed by fg=T2($i$)/T1($i$), with the result that the target code amounts of the sequential pictures can be expressed as Tp2(0), Tb2(1), ...

Further, in FIG. 10, Tb1(0), Tb1(1), ... denote the temporal code amounts of the sequential blocks, and Tb2(0), Tb2(1), ... denote the target code amounts of the sequential blocks. FIG. 10 indicates that the temporal code amount Tp1($i$) of one picture can be converted into the target code amount Tp2($i$) of one picture, where the temporal code amounts of a plurality of blocks for constituting one picture having the temporal code amount Tp1($i$) are denoted by Tb1(0), Tb1(1), ...

In other words, when the code amounts are converted in accordance with the conversion characteristics expressed by fg=Tp2($i$)/Tp1($i$)=T2($i$)/T1($i$), the temporal code amounts Tb(0), Tb1(1), ... of the sequential blocks for constituting the single picture are also converted in accordance with the conversion characteristics expressed by fg=Tp2($i$)/Tp1($i$)= T2($i$)/T1($i$), with the result that the target code amounts of the sequential blocks can be expressed as Tb2(0), Tb2(1), ...

Further, in the conversion characteristics of the target code amount converter 22 shown in FIG. 10, although the ratio of the temporal code amount to the target code amount of the upper hierarchy is applied to the lower hierarchy so as to be divided in proportional relationship. Without being limited only thereto, it is also possible to adopt the weighted division in accordance with the formula (3) as already described.

In the coding apparatus according to the present invention, since the code amounts can be divided appropriately so that the picture quality can be equalized, it is possible to improve the picture quality. In addition, since the fluctuations in quantization step width due to the quantization step width control operation can be reduced whenever a changes, it is possible stabilize the picture quality in the intra-frames and inter-frames, while reducing the average code amounts.

What is claimed is:

1. A variable transfer rate coding method of coding moving picture signals of a plurality of groups of pictures, comprising the steps of:

quantizing the moving picture signals under control of quantization step width per group of pictures;

coding the quantized picture signals per group of pictures, the coding being executed by a first coding and a second coding executed after the first coding;

obtaining a first code amount of the coded picture signals per group of pictures coded by the first coding and a second code amount of the coded picture signals per picture or block-unit obtained by dividing the picture included in each group of pictures coded by the first coding;

calculating, in response to the first code amount, a temporal total code amount of the moving picture signals of the plurality of groups of pictures by processing the first code amount with conversion characteristics;

comparing the temporal total code amount with a reference total code amount, to decide a first target code amount for the second coding per group of pictures in order that a total code amount obtained by calculating the first target code amount becomes a maximum amount within the reference total code amount;

determining, in response to the first target code amount and the second code amount, a second target code amount for the second coding per the picture or the block-unit included in each group of pictures in accordance with the maximum amount of the total code amount; and varying the quantization step width on the basis of the second target code amount for the second coding by the coding step.

2. The variable transfer rate coding method of claim 1, wherein the first code amount obtaining step comprises the steps of:

sequentially counting code amounts of blocks per picture in response to the coded picture signals per group of pictures;

sequentially counting code amounts of pictures in each group in response to the code amounts of blocks; and counting the first code amounts in response to the code amounts of pictures, wherein at least either of a code amount of a block or a picture is obtained as the second code amount.

3. The variable transfer rate coding method of claim 1, wherein the total code amount calculating step comprises the steps of:

sequentially converting the first code amount per group of pictures into different code amounts by means of different conversion characteristics;

accumulating each different code amount per group of pictures over the groups of pictures to generate different total code amounts of the groups of pictures under the different conversion characteristics;

comparing each of the different total code amounts with the maximum total code amount; and determining which one of the different total code amounts is the largest and the closest to the maximum total code amount, to output one of the conversion characteristics corresponding to the determined total code amount as the first target code amount.

4. The variable transfer rate coding method of claim 1 further comprising the step of comparing the first code amount with the second target code amount to output quantization step width information for each block of a picture, the quantization step width being varied on the basis of the quantization step width information by the varying step.

5. The variable transfer rate coding method of claim 4, wherein the comparing step comprises the steps of:

detecting a code amount of each block in response to the coded picture signals;

subtracting the detected code amount from the second target code amount;

comparing a subtraction result of the subtracting step with a reference positive value to output a first comparison signal when the subtraction result is positive and greater than the reference positive value;

comparing the subtraction result with a reference negative value to output a second comparison signal when the subtraction result is negative and greater than the reference negative value;

outputting, in response to the first comparison signal, a first quantization step width information, the quantization step width being narrowed by the varying step; and outputting, in response to the second comparison signal, a second quantization step width information, the quantization step width being widened by the varying step.

* * * * *